US012059907B2

(12) United States Patent
Otani et al.

(10) Patent No.: US 12,059,907 B2
(45) Date of Patent: Aug. 13, 2024

(54) RECORDING APPARATUS AND RECORDING METHOD

(71) Applicant: CANON KABUSHIKI KAISHA, Tokyo (JP)

(72) Inventors: Takumi Otani, Kanagawa (JP); Ryosuke Hirokawa, Kanagawa (JP); Yoshiaki Murayama, Tokyo (JP); Kanako Soma, Kanagawa (JP); Akihiro Mouri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 17/850,227

(22) Filed: Jun. 27, 2022

(65) Prior Publication Data

US 2023/0001718 A1 Jan. 5, 2023

(30) Foreign Application Priority Data

Jun. 28, 2021 (JP) ................................ 2021-106633

(51) Int. Cl.
*B41J 25/00* (2006.01)
*B41J 29/38* (2006.01)

(52) U.S. Cl.
CPC ............. *B41J 25/006* (2013.01); *B41J 25/00* (2013.01); *B41J 29/38* (2013.01)

(58) Field of Classification Search
CPC ...... B41J 2/04573; B41J 2/04586; B41J 2/15; B41J 25/006; B41J 19/202; B41J 19/142; B41J 2/045; B41J 2/175; B41J 25/00; B41J 29/38; G06K 15/02
See application file for complete search history.

(56) References Cited

U.S. PATENT DOCUMENTS

2007/0139487 A1* 6/2007 Sekiguchi ............ B41J 2/04581 347/70
2008/0136854 A1* 6/2008 Yamaguchi .......... B41J 2/04573 347/12
2012/0218330 A1* 8/2012 Fujita ..................... B41J 19/145 347/9
2015/0174910 A1* 6/2015 Kaneko ................ B41J 2/17596 347/85

(Continued)

FOREIGN PATENT DOCUMENTS

JP 2015147423 A 8/2015

*Primary Examiner* — John Zimmermann
(74) *Attorney, Agent, or Firm* — Canon U.S.A., Inc. IP Division

(57) ABSTRACT

A recording apparatus includes an ink tank, a carriage, a recording head mounted on the carriage, a carriage control unit, and a supply tube connected to the recording head and the ink tank and including a bent portion that moves with carriage movement. The carriage control unit moves the carriage in predetermined directions to record on a recording medium. Assuming that, of an acceleration/deceleration area of a carriage moving area, an area in which pressure changes to decrease negative pressure in the recording head is a first area, and an area in which the pressure changes to increase the negative pressure in the recording head is a second area, the carriage control unit moves the carriage so that an absolute value of acceleration or deceleration of the carriage in the first area is less than an absolute value of acceleration or deceleration of the carriage in the second area.

18 Claims, 15 Drawing Sheets

(56) References Cited

U.S. PATENT DOCUMENTS

| | | | | |
|---|---|---|---|---|
| 2019/0315121 | A1* | 10/2019 | Furuhata | B41J 2/04586 |
| 2020/0039216 | A1* | 2/2020 | Arakane | B41J 2/04563 |
| 2020/0101720 | A1* | 4/2020 | Arakane | B41J 29/38 |
| 2020/0207076 | A1* | 7/2020 | Hasegawa | B41J 2/04536 |
| 2021/0078321 | A1* | 3/2021 | Uchida | B41J 19/207 |
| 2021/0402814 | A1* | 12/2021 | Arakane | G06K 15/1822 |

* cited by examiner

RECORDING APPARATUS AND RECORDING METHOD

BACKGROUND

Field

The present disclosure relates to a recording apparatus and a recording method.

Description of the Related Art

Japanese Patent Laid-Open No. 2015-147423 discloses a configuration of an ink-jet recording apparatus in which ink is supplied from an ink tank to a recording head through a tube using a water head difference.

Such an ink-jet recording apparatus prevents ink from dripping off by maintaining negative pressure in the recording head using the water head difference to keep a meniscus using surface tension generated in the nozzle of the recording head. The pressure in the recording head is decreased as the ink in the recording head is ejected, thereby charging the ink into the recording head from the ink tank through the tube.

The ink in the tube is acted upon by an inertia force due to acceleration/deceleration when the recording head moves back and forth. In recording an image that requires less ink ejected from the recording head, the pressure in the recording head is not decreased so much by the ejection of the ink. This causes the pressure in the recording head to be gradually increased because of an inertia force due to the movement of the recording head. The increase in the pressure in the recording head may break the meniscus of the ink formed in the nozzle to expand the ink over the nozzle surface, causing an ejection failure.

SUMMARY

The present disclosure prevents the occurrence of ejection failure due to the break of the meniscus in the nozzle of a recording head even in recording an image that needs less ink to be ejected.

According to an aspect of the present disclosure, a recording apparatus includes an ink tank configured to store ink, a recording head including a nozzle configured to eject the ink, a carriage having the recording head mounted on the carriage and configured to move back and forth in predetermined directions to perform recording on a recording medium, a carriage control unit configured to move the carriage, and a supply tube connected to the recording head and the ink tank and configured to supply the ink from the ink tank into the recording head, wherein the supply tube includes a bent portion configured to move with movement of the carriage in the predetermined directions, wherein, assuming that, of an acceleration/deceleration area of a carriage moving area in which the carriage is accelerated or decelerated to change speed of the carriage, an area in which pressure changes to decrease negative pressure in the recording head is a first area, and an area in which the pressure changes to increase the negative pressure in the recording head is a second area, the carriage control unit moves the carriage in such a manner that an absolute value of acceleration of the carriage that is accelerated or decelerated in the first area is less than an absolute value of acceleration of the carriage that is accelerated or decelerated in the second area.

Further features of the present disclosure will become apparent from the following description of exemplary embodiments with reference to the attached drawings.

DESCRIPTION OF THE EMBODIMENTS

Mechanical Configuration of Ink-Jet Recording Apparatus

Overview of the Apparatus

Figure 1:
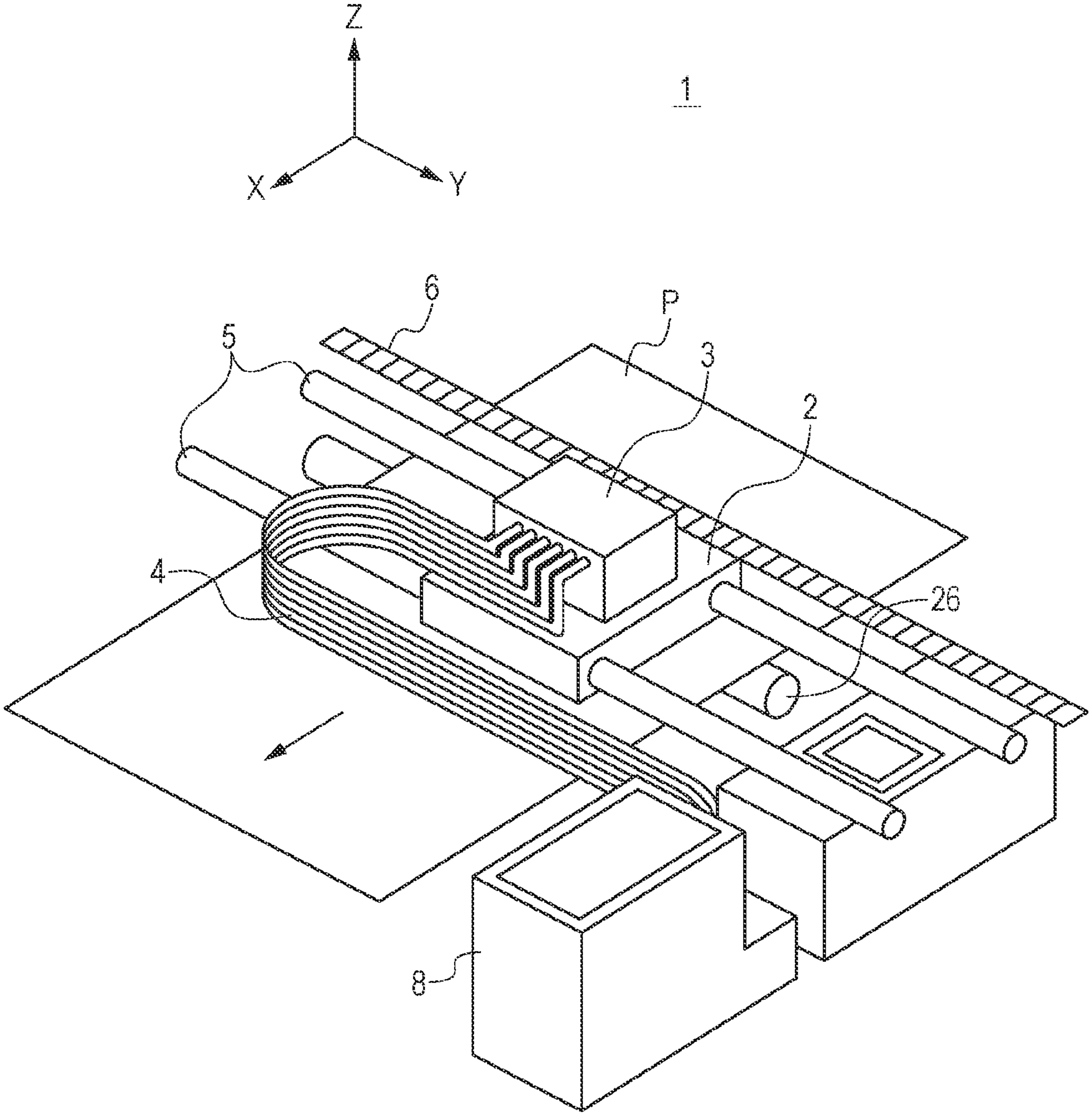
FIG. 1 is a perspective view of a recording apparatus according to an embodiment of the present disclosure.

FIG. 1 is a perspective view of the internal structure of an ink-jet recording apparatus 1 (hereinafter also referred to as "recording apparatus") according to an embodiment. In the drawings, the X-direction is the conveying direction of a recording medium P, the Y-direction is the carriage moving direction, and the Z-direction is a vertical direction. The ink-jet recording apparatus 1 of FIG. 1 is a what-is-called serial-scan recording apparatus, which moves a recording head 3 in a main scanning direction (Y-direction) crossing the conveying direction (X-direction) of the recording medium P to form an image.

Figure 3:
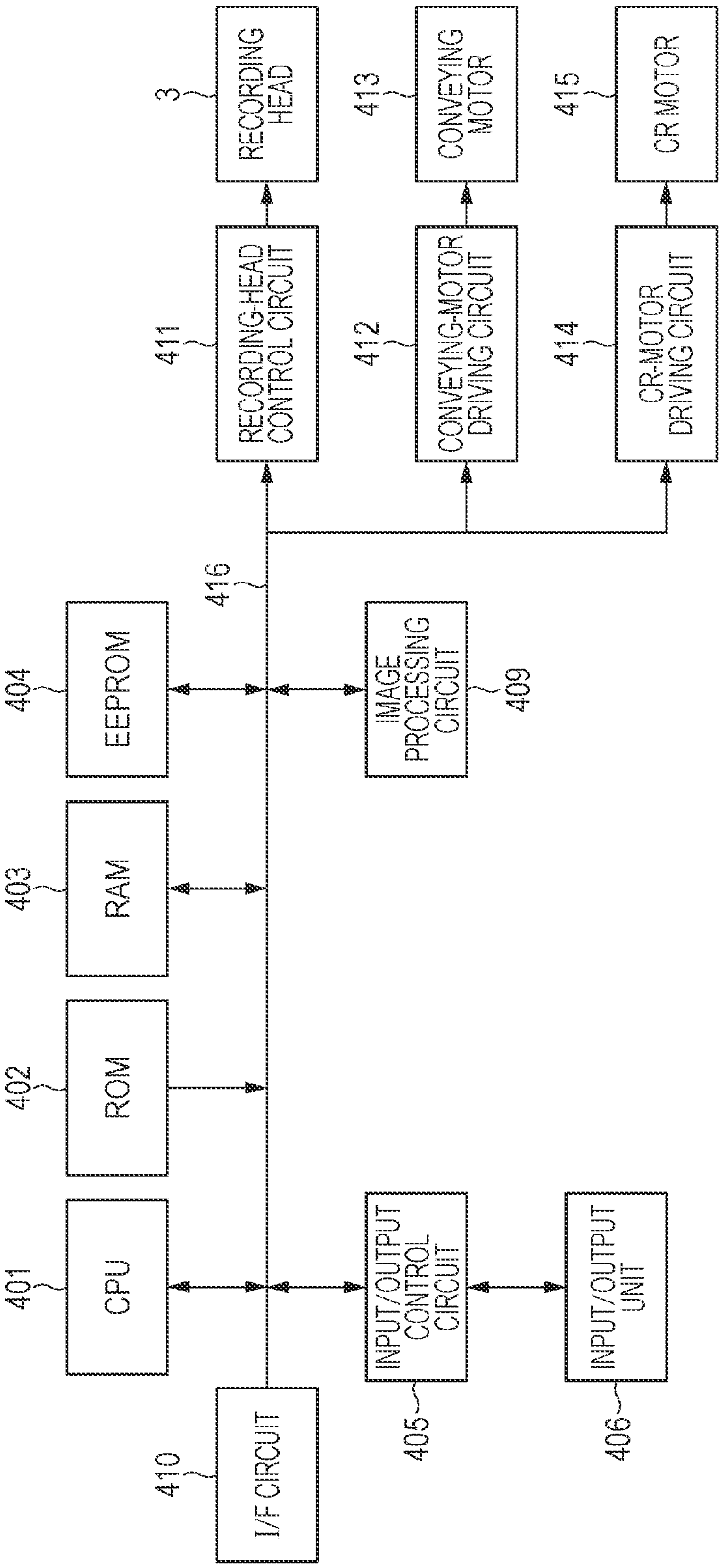
FIG. 3 is a block diagram illustrating the configuration of the control system of the recording apparatus according to the embodiment.

Referring to FIG. 1, the configuration and operation in recording of the recording apparatus 1 will be described. First, a conveying motor 413 (FIG. 3) is driven to cause a conveying roller 26 via a gear to convey the recording medium P to a position facing the recording head 3. When the recording medium P is conveyed to the position facing the recording head 3, a carriage 2 is moved along guide rails 5 extending in the main scanning direction by a carriage motor 415 (FIG. 3). The driving force from the carriage motor 415 to the carriage 2 is transmitted through a carriage belt 6. Instead of the carriage belt 6, another driving system may be employed, such as a combination of a lead screw rotationally driven by the carriage motor 415 and extending in the main scanning direction and an engaging portion that is provided at the carriage 2 and that engages with the groove of the lead screw.

Ink is ejected from the ink ejection port (nozzle of nozzle arrays 101 to 108 in FIG. 2) of the recording head 3, which is detachably attached to the carriage 2, at a timing based on a position signal obtained by an encoder (not shown) while the carriage 2 is being moved to record an image with a fixed band width corresponding to the range of the nozzle array. The ink ejected from the recording head 3 is supplied from an ink supply system 8 through supply tubes 4. One band is a recordable area of the recording head 3 by moving in one direction. In this embodiment, the recording head 3 moves at a scanning speed of 40 inches per second to eject ink at the timing of 600 dpi (dots/inch). Thereafter, the recording medium P is conveyed, on which recording is performed for the next band width. With this recording apparatus 1, the recording medium P corresponding to the band width may be conveyed between the individual scanning operations, or alternatively, the recording medium P may not be conveyed by one band width every scanning operations but may be conveyed after a plurality of scanning operations. Alternatively, multipath recording may be performed in which a plurality of scanning operations using different nozzles for one band and a sheet conveying operation are performed by recording data that is thinned out using a predetermined mask every scanning operations and then performing sheet feeding for about 1/n band and performing scanning again.

The recording head 3 is fitted with a flexible wiring board for supplying a signal pulse for driving ejection, a head-temperature regulating signal, and so on. The other end of the flexible wiring board connects to a control unit including one or more control circuits (e.g., recording-head control circuit 411 in FIG. 3) that control the recording apparatus 1 (described later).

Configuration of Recording Head

Figure 2:
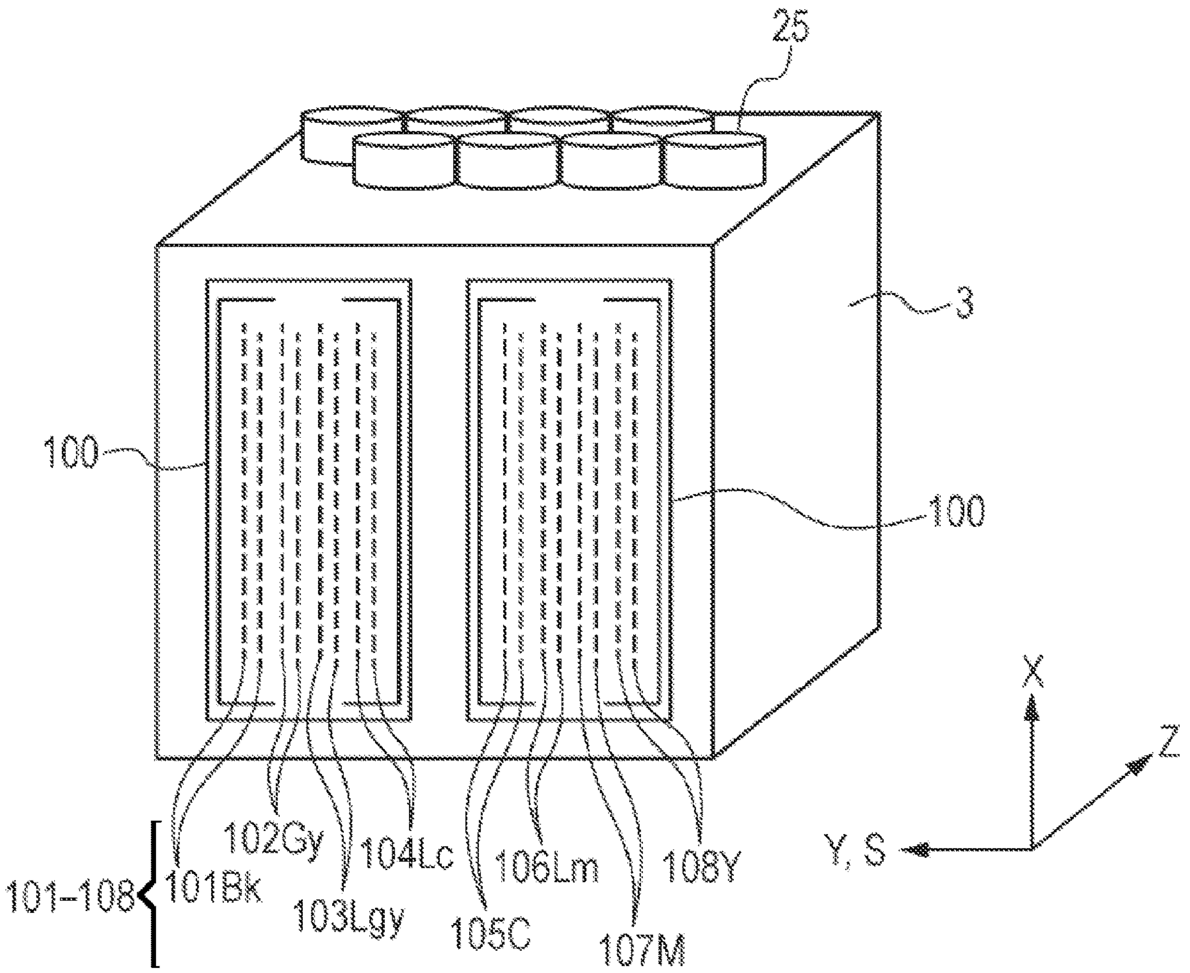
FIG. 2 is an external schematic perspective view of a recording head according to the embodiment.

FIG. 2 is a schematic perspective view of the recording head 3 mounted on the carriage 2 of the recording apparatus 1 seen from the direction in which ink is ejected.

The recording head 3 is capable of ejecting different tones (including colors and tints) of ink in the main scanning direction S. In this embodiment, the recording head 3 can eject black (Bk), gray (Gy), light gray (Lgy), light cyan (Lc), cyan (C), light magenta (Lm), magenta (M), and yellow (Y) inks. A plurality of recording elements corresponding to the individual inks arranged in the X-direction and nozzle arrays 101 to 108 corresponding to the individual recording elements are juxtaposed in the Y-direction on two ejecting element substrates 100. The individual recording element arrays connect to the ink supply tubes 4 at connections 25. The inks are supplied from the ink supply system 8 through the connections 25 to the individual recording element arrays through ink channels in the recording head 3. Each supplied ink forms a meniscus on the surface of each nozzle because of surface tension. The inks do not go out of the recording head 3 unless a pressure change exceeding the withstand pressure of the meniscus occurs. While this embodiment takes the recording head capable of ejecting eight colors of ink as an example, there is no limitation to the colors and the number of colors of the inks in the recording head. Specifically, a recording head that ejects a single black (Bk) ink or a recording head that ejects four-color inks, such as black (Bk), cyan (C), magenta (M), yellow (Y) inks, may be used.

Block Diagram

FIG. 3 is a block diagram illustrating the configuration of the control system of the ink-jet recording apparatus 1. A read-only memory (ROM) 402 is a nonvolatile memory which stores, for example, a program for controlling the ink-jet recording apparatus 1 and a program for implementing the operation of this embodiment. The operation of this embodiment is implemented by, for example, a central processing unit (CPU) 401 that reads and executes the program stored in the ROM 402 into a random-access memory (RAM) 403. The RAM 403 is also used as a working memory for the CPU 401. An electrically erasable programmable read-only memory (EEPROM) 404 stores data that should be stored even when the power supply to the ink-jet recording apparatus 1 is turned off.

An interface (I/F) circuit 410 connects the ink-jet recording apparatus 1 to an external network, such as a local area network (LAN). The ink-jet recording apparatus 1 transmits and receives various jobs and data to and from an external device, such as a host computer, via the I/F circuit 410.

An input/output unit 406 includes an input section and an output section. The input section receives an instruction to turn on the power, an instruction to execute recording, and instructions to set various functions from the user. The output section displays various items of apparatus information, such as a power-saving mode, and setting screens for various functions that can be executed by the ink-jet recording apparatus 1. In this embodiment, the input/output unit 406 is an operation panel provided on the ink-jet recording apparatus 1. The input/output unit 406 is connected to a system bus 416 via the input/output control circuit 405 so as to be capable of transmission and reception of data. In this embodiment, the CPU 401 controls information notification of the output section.

The input section may be the keyboard of the external host computer so that user's instructions can be received from the external host computer. The output section may be a light-emitting diode (LED) display, a liquid crystal display (LCD), or a display connected to the host device. If the input/output unit 406 is a touch panel, user's instructions can be received with a software keyboard. The input/output unit 406 may be a speaker and a microphone to output notification to the user by voice and input user's instruction by voice.

Alternatively, an external information processing apparatus including a CPU and a ROM that have the same functions as those of the CPU 401 and the ROM 402 and connected to the ink-jet recording apparatus 1 may perform a recording-medium determination process (described later) to determine recording media to be used in the ink-jet recording apparatus 1.

A recording-head control circuit 411 supplies a drive signal according to the record data to a nozzle driving circuit mounted on each recording head 3 and including a selector and a switch to control the recording operation of the recording head 3, such as nozzle drive sequence. For example, when print data is sent from the outside to the I/F circuit 410, the print data is temporarily stored in the RAM 403. The recording-head control circuit 411 drives the recording head 3 on the basis of record data for recording converted from the print data. At that time, a conveying-motor driving circuit 412 drives a conveying motor 413 on the basis of, for example, the band width of the record data to rotate the conveying roller 26 connected to the conveying motor 413, thereby conveying the recording media. A carriage-motor (CR) driving circuit 414 drives a CR motor 415 to move the carriage 2 along the guide rails 5 with a carriage belt 6.

The data sent from the I/F circuit 410 includes not only the print data but also data with content that is set by the printer driver. The print data may be received from the outside via the I/F circuit 410 and stored in a storage or may be stored in a storage, such as a hard disk, in advance. The CPU 401 reads the print data from the storage and converts the print data to record data for using the recording head 3 by controlling an image processing circuit 409 (binarizing process). The image processing circuit 409 executes, in addition to the binarizing process, color space conversion, HV conversion, gamma correction, image rotation, and other various image processing operations.

The CPU 401 calculates the average duty cycle of ink per band on the basis of the record data. In this embodiment, the CPU 401 counts a cycle in which two dots of ink are ejected to a 1/600 inch (600 dpi) square as 100% duty cycle. The calculated average duty cycle is temporarily stored in the RAM 403. The average duty cycle is obtained from the RAM 403 in determining the velocity of the carriage 2, and is used to determine the velocity of the carriage 2.

Configuration of Ink Supply System

Ink Supply System

Figure 4:
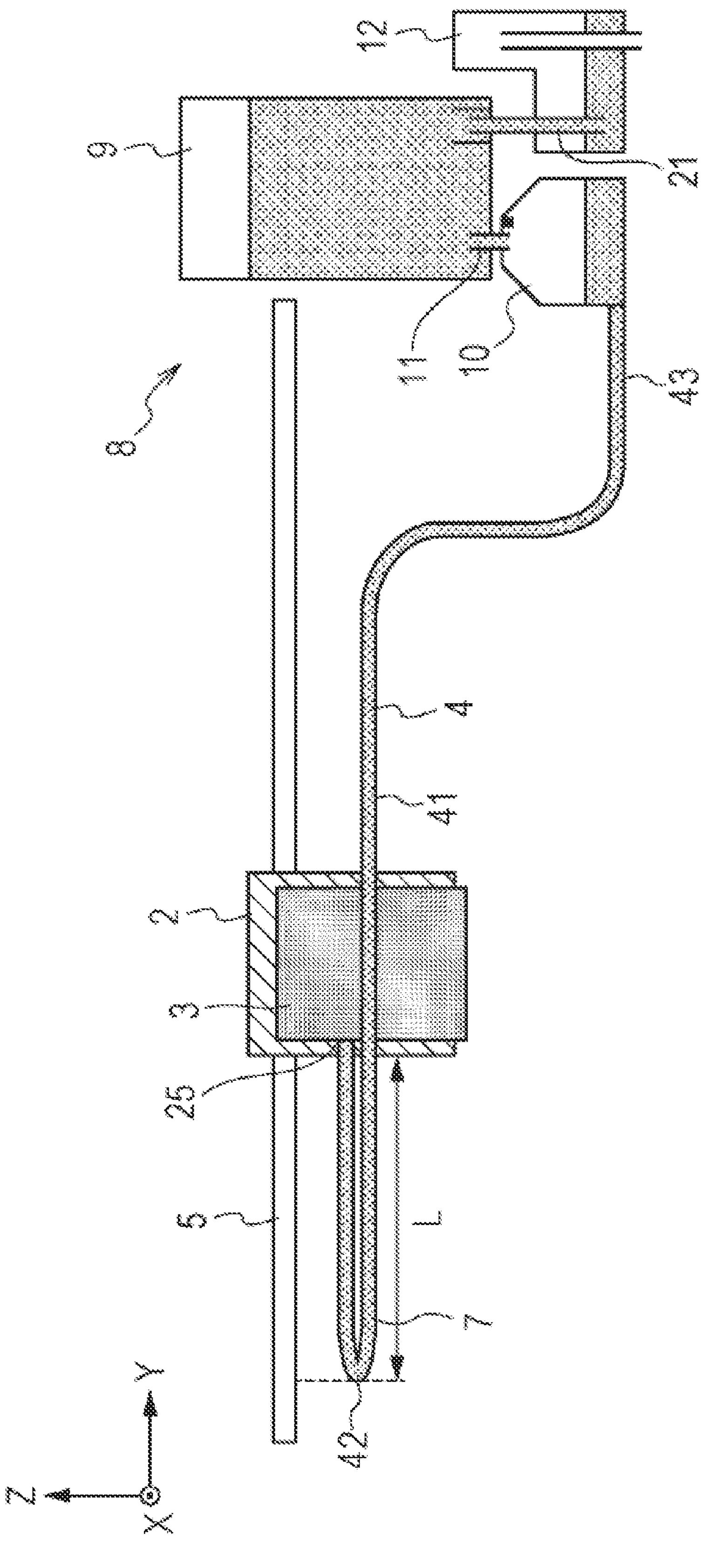
FIG. 4 is a schematic diagram illustrating the configuration of an ink supply system according to the embodiment.

FIG. 4 is a schematic diagram illustrating the configuration of the ink supply system 8 of this embodiment, that is, the ink supply system 8, the recording head 3, and the supply tube 4 connecting the ink supply system 8 with the recording head 3. The ink supply system 8 and the supply tube 4 are actually provided for each color. However, in this section, a diagram of description will be made using a diagram of a one-color ink supply system 8 and a supply tube 4 is used for illustration.

In FIG. 4, the ink supply system 8 includes a main tank 9, a subtank 10, a hollow tube 11 connecting the subtank 10 and the main tank 9, a buffer chamber 12, and a communicating tube 21 connecting the main tank 9 and the buffer chamber 12. The supply tube 4 is made of a flexible material and connects the subtank 10 and the recording head 3 together. The supply tube 4 connected to the subtank 10 includes an extending portion 41 parallel to the moving direction of the carriage 2 and a bent portion 42 at an intermediate position so as to connect to the left of the recording head 3 in the drawing, creeping around inside the recording apparatus main body. The supply tube 4 includes a portion 43 parallel to guide rails 5. The arrangement of the supply tube 4 illustrated in FIG. 4 is given for illustrative purposes only.

The main tank 9 illustrated in FIG. 4 is detachably attached to the recording apparatus main body. In the ink-jet recording apparatus 1 of this embodiment, the main tank 9 contains a larger quantity of ink than the subtank 10. The main tank 9 communicates with the subtank 10 through the hollow tube 11 and communicates with the buffer chamber 12 through the communicating tube 21. The main tank 9 connects to the hollow tube 11 and the communicating tube 21 at the bottom of the main tank 9 in an attached state and is sealed except the connecting portion.

The main tank 9 discussed herein may be of a detachable cartridge type or in the form of injecting ink from a bottle into the main tank 9.

Variations in Pressure

As described above, the supply tube 4 connected to the subtank 10 has the extending portion 41 parallel to the Y-direction in which the carriage 2 moves and the bent portion 42 at which the supply tube 4 is folded so as to be connected to the −Y side (the left in FIG. 4) of the recording head 3 and which creeps around in the recording apparatus main body. A length L from the bent portion 42 to the connection 25 with the recording head 3 varies with the reciprocating motion of the carriage 2. In this embodiment, the bent portion 42 is located on the left of the apparatus 1. For this reason, in moving the carriage 2 on the forward path from the right to the left in FIG. 1, the length L from the bent portion 42 to the connection 25 with the recording head 3 decreases with the movement of the supply tube 4. In moving the carriage 2 on the backward path form the left to the right, the length L from the bent portion 42 to the connection 25 with the recording head 3 increases with the movement of the supply tube 4. When the supply tube 4 moves following the reciprocating motion of the carriage 2, an inertia force acts on ink 7 in the portion with the length L from the bent portion 42 to the connection 25 with the recording head 3. This inertia force is generated when the carriage 2 is accelerated and decelerated to move the ink 7 in the supply tube 4 connected to the recording head 3, thereby causing a dynamic pressure that changes the internal pressure of the recording head 3.

Parameters of Pressure Variations

Figure 5:
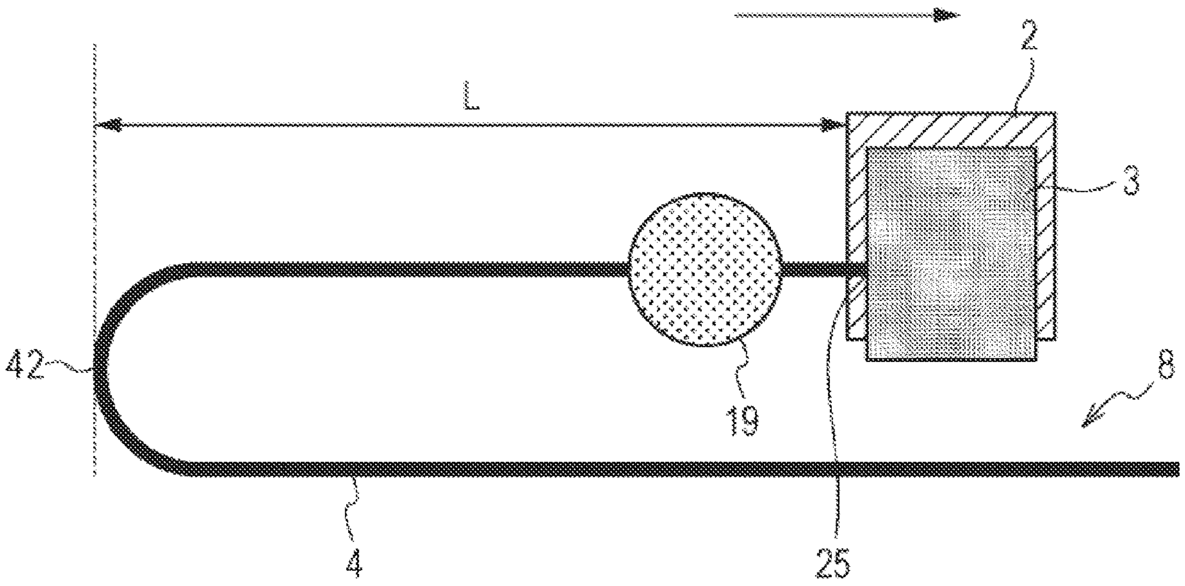
FIG. 5 is a schematic diagram of the ink supply system illustrating measurement of variations in pressure.
Figure 6:
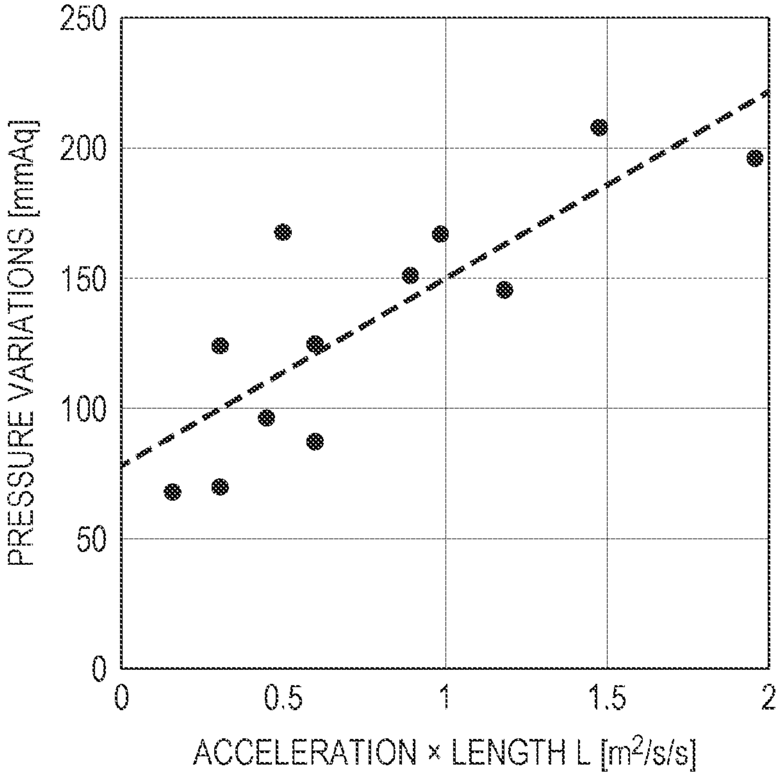
FIG. 6 is a graph showing the relationship between the product of the acceleration of a carriage and the length from a bent portion and pressure variations according to the embodiment.

Variations in the internal pressure of the recording head 3 are determined from the length L between the supply tube 4 and the connection 25 with the recording head 3 and the acceleration or deceleration. FIG. 5 is a schematic diagram of the ink supply system 8 in which a pressure measuring device 19 is disposed at the supply tube 4, illustrating measurement of variations in pressure due to the movement of ink when the carriage 2 is accelerated. The variations in pressure immediately in front of the connection 25 with the recording head 3 when the carriage 2 is accelerated from the left to the right in FIG. 5 are measured. At that time, the acceleration of the carriage 2 and the length L from the bent portion 42 of the supply tube 4 to the connection 25 with the recording head 3 at the start of acceleration of the carriage 2 are changed. The result of measurement is shown in FIG. 6. The horizontal axis indicates the product of the acceleration of the carriage 2 and the length L from the bent portion 42 of the supply tube 4 to the connection 25 with the recording head 3 at the start of acceleration. The vertical axis indicates the pressure variations converted from the output values of the pressure measuring device 19. This graph shows they are in a proportional relationship. This shows that pressure variations in the recording head 3 increase as the acceleration of the carriage 2 increases and the length L from the bent portion 42 of the supply tube 4 to the connection 25 with the recording head 3 increases.

Figure 7:
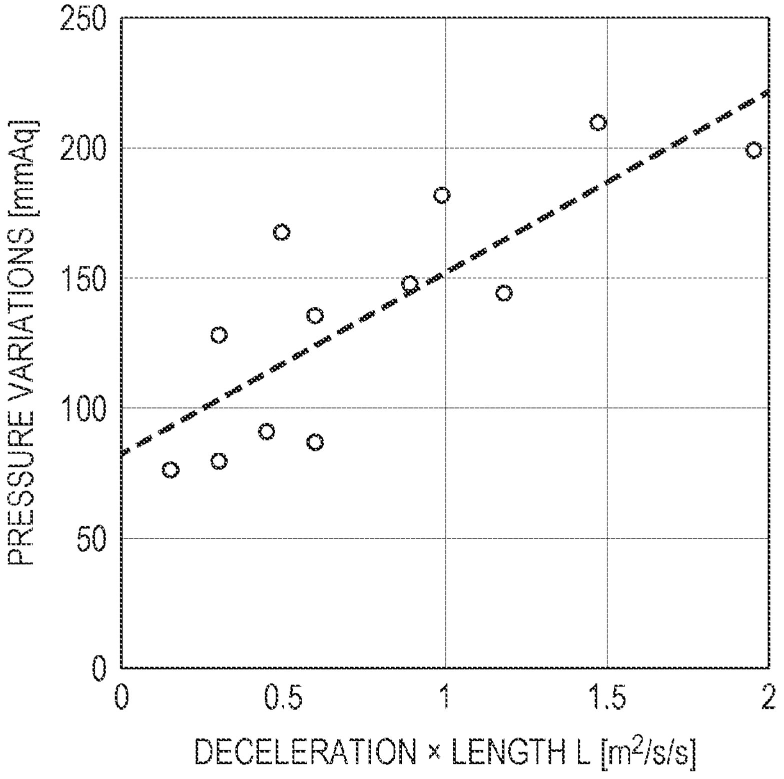
FIG. 7 is a graph showing the relationship between the product of the deceleration of the carriage and the length from a bent portion and pressure variations according to the embodiment.

The relationship with deceleration was measured in the same way. FIG. 7 shows the result of measurement as in the measurement at acceleration. The horizontal axis indicates the product of the deceleration of the carriage 2 and the length L from the bent portion 42 of the supply tube 4 to the connection 25 with the recording head 3 at the start of deceleration, and the vertical axis indicates the pressure variations converted from the output values of the pressure measuring device 19. This shows that the values at deceleration are in a proportional relationship, as at acceleration. The proportional relationship does not change although the inclination changes according to the diameter of the supply tube 4 or the viscosity of the ink.

Figure 8:
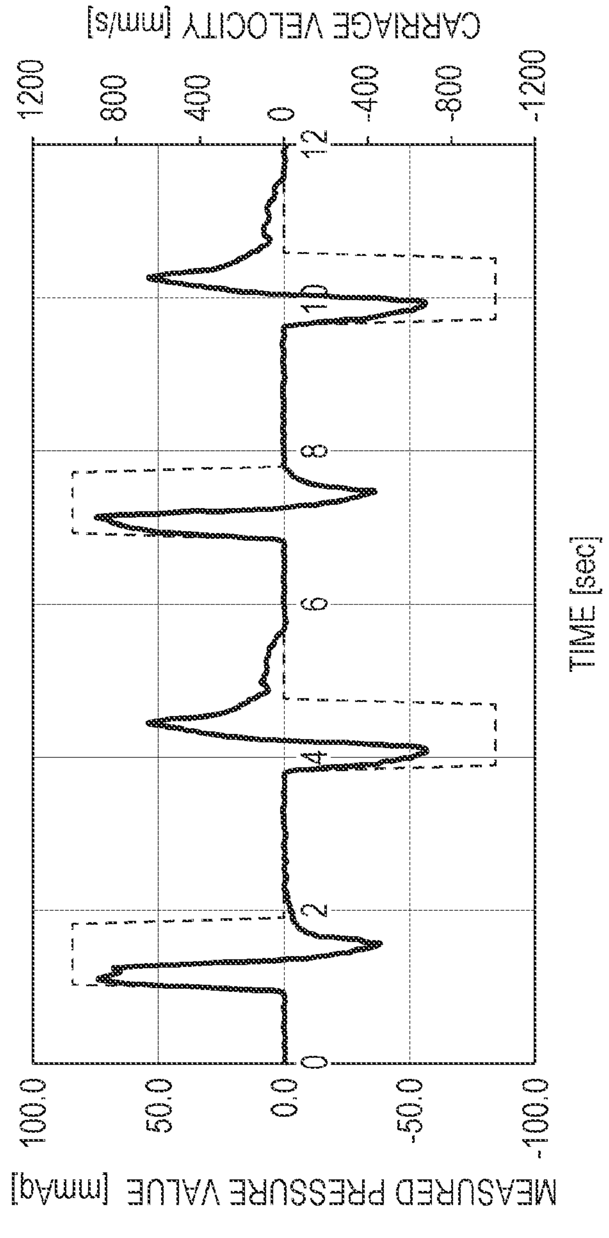
FIG. 8 is a graph showing the relationship between the change in carriage velocity and pressure variations according to the embodiment.

Next, pressure variations were measured when acceleration and deceleration are repeated, although intermittently. FIG. 8 shows the result in which the horizontal axis indicates the time, and the vertical axis indicates the velocity of the carriage 2 in a dotted line and the measured pressure values in a solid line. First, the carriage 2 is moved from the state in FIG. 4 to the left. This causes an inertia force to act on the ink 7 in the supply tube 4, moving the ink 7 rightward, and as a result, the measured pressure value shifts to positive side. When the carriage 2 reaches a target velocity, the carriage 2 moves to a predetermined position at the constant velocity, and at the left end, the velocity reaches zero, so that the carriage 2 is decelerated. When deceleration is started, the ink 7 in the supply tube 4 is acted upon by an inertia force, so that the ink 7 moves leftward. This causes the measured pressure value to shift to the negative pressure side. When the carriage 2 moves from the left end toward the right end, the opposite phenomenon to the phenomenon described above occurs. Accordingly, the pressure shifts to the negative side at acceleration, and shifts to the positive side at deceleration at the right end. In other words, in the reciprocating motion of the carriage 2 in FIG. 4, the acceleration/deceleration when the carriage 2 is on the right changes to the positive pressure side, and the acceleration/deceleration when the carriage 2 is on the left changes to the negative pressure side. In this measurement, the carriage 2 is moved back and forth intermittently, so that the pressure varied up and down with zero as the reference. Variations in the pressure when the carriage 2 is continuously moved back and force will be described hereinbelow.

Changes in Variation Reference

To describe decompression due to variations in pressure caused by continuous reciprocating motion and ink ejection, the pressure measuring device 19 was disposed immediately in front of the recording head 3 in the recording apparatus 1 shown in FIG. 1, as in FIG. 5, and variations in pressure during printing were measured.

Figure 9A:
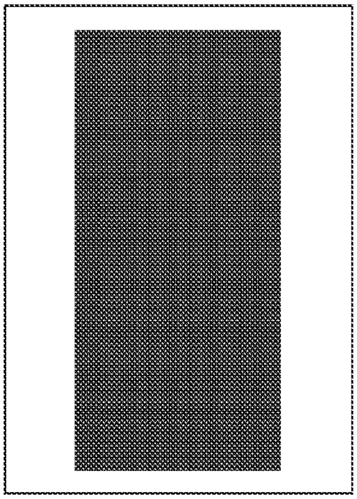
FIGS. 9A and 9B are schematic diagram illustrating image patterns used in the examples.
Figure 9B:
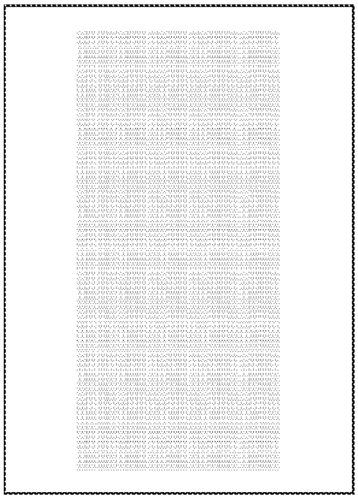
Figure 10A:
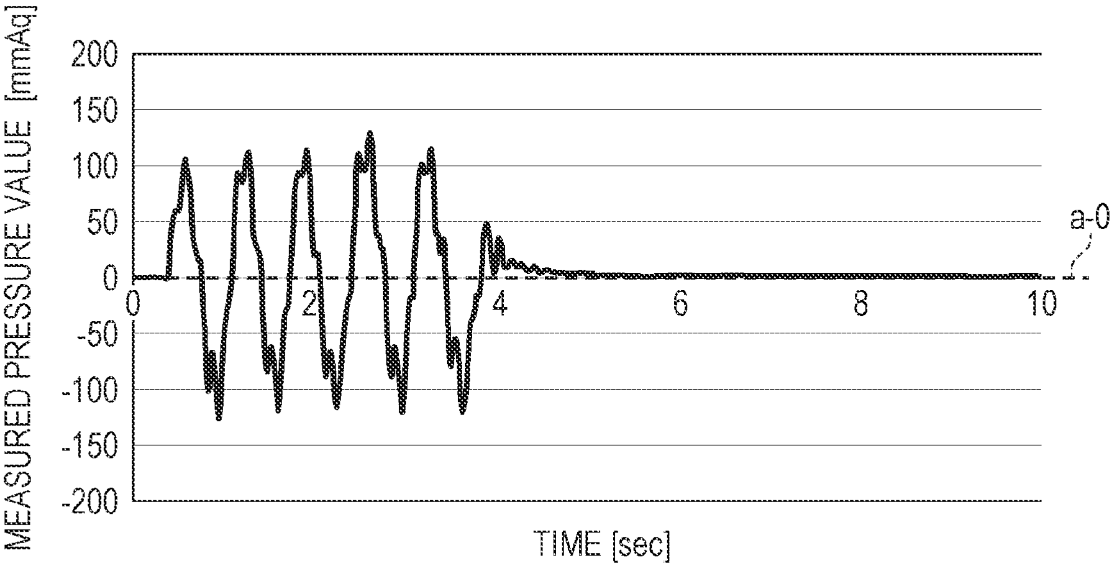
FIGS. 10A and 10B are graphs showing variations in pressure reference due to printing in an example.
Figure 10B:
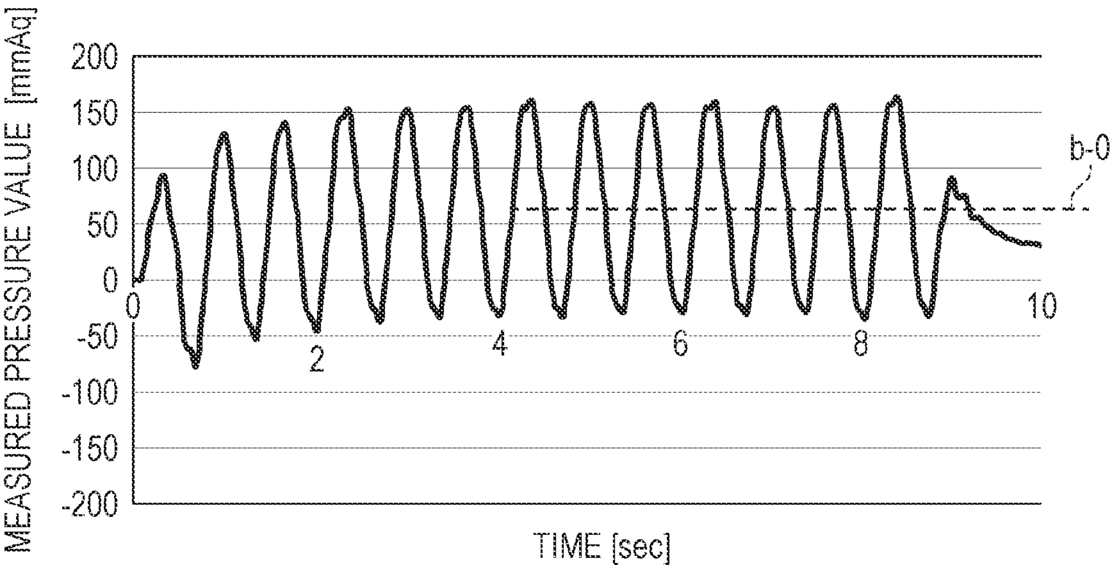

FIGS. 9A and 9B illustrate image patterns used in this examination. FIG. 9A illustrates an image pattern simulating a high discharge rate, 20 ng/600 dpi per unit area. FIG. 9B illustrates an image pattern simulating a low discharge rate, 1 ng/600 dpi. The absolute value of acceleration was set to 12 m/s/s for both of FIGS. 9A and 9B. FIGS. 10A and 10B show pressure variation measurement results when printing is performed using the above image data, respectively. In the case of FIG. 10A in which the printing ink volume is as much as 20 ng/600 dpi, the reference value (a-0) of pressure variations changed vertically while being kept at about 0 mmAq because the pressure in the recording head 3 decreased because the ink was ejected from the nozzle. In contrast, in the case of FIG. 10B in which the printing ink volume is as small as 1 ng/600 dpi, little ink was ejected, so that the pressure in the recording head 3 did not decrease. As a result, the reference value (b-0) of pressure variations shifted gradually to the positive pressure side because of the continuous reciprocating motion of the carriage 2.

Figure 11A:
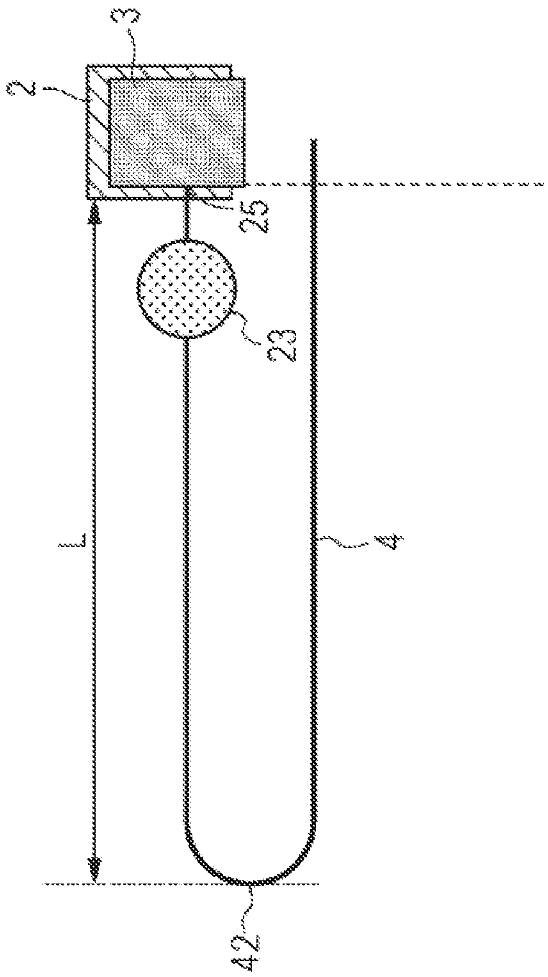
FIGS. 11A and 11B are schematic diagrams illustrating the relationship between the movement of the carriage and the length of the supply tube in an example.
Figure 11B:
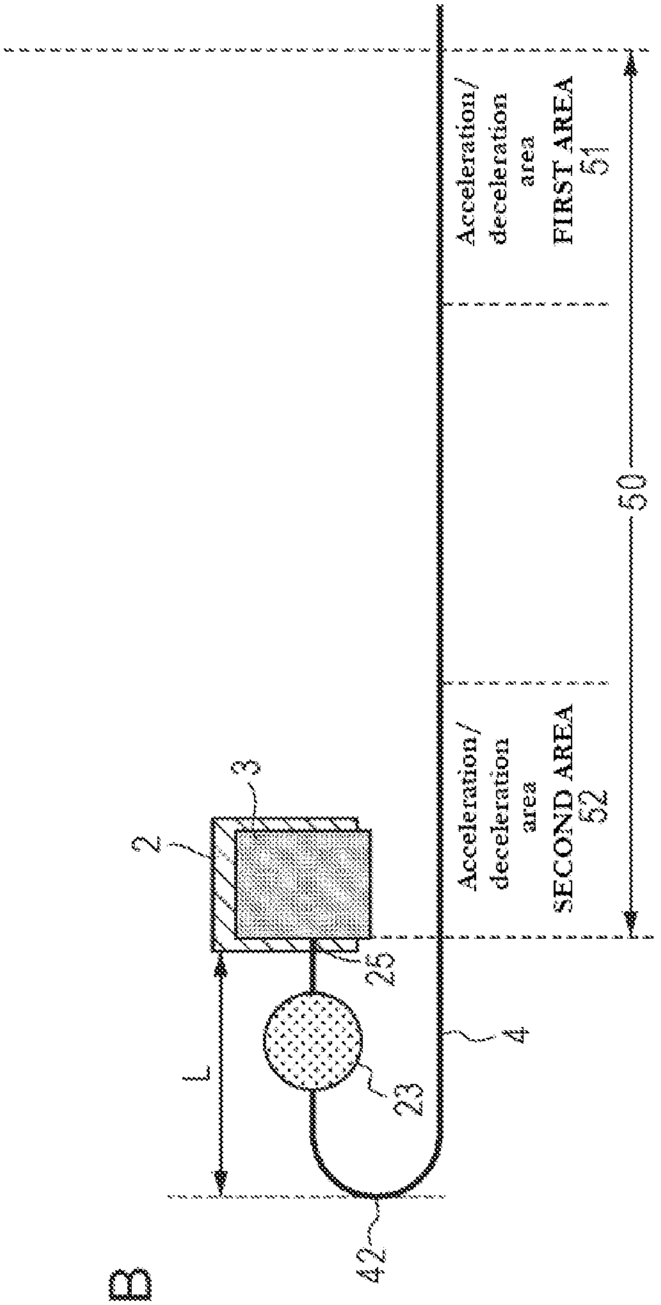

The reason why the reference value (b-0) shifts to the positive pressure side will be described with reference to FIGS. 11A and 11B. FIGS. 11A and 11B are schematic diagrams illustrating how the length L from the bent portion 42 of the supply tube 4 to the connection 25 with the recording head 3 changes with the reciprocating motion of the carriage 2 in the image forming apparatus used in this examination. As shown in FIG. 11A, when the carriage 2 is on the right, the length L from the bent portion 42 of the supply tube 4 to the connection 25 with the recording head 3 is large. When the carriage 2 moves to the left, the length L decreases, as shown in FIG. 11B. Since the inertia force that acts on the ink 7 in the supply tube 4 is proportional to the product of the acceleration/deceleration of the carriage 2 and the length L from the bent portion 42 of the supply tube 4 to the connection 25 with the recording head 3, as described above, the range of variations to the positive side on the right side is larger than the range of variation to the negative side on the left side. This caused the reference value (b-0) of pressure variations in FIG. 11B, in which the printing ink quantity is as small as 1 ng/600 dpi, to shift to the positive pressure side.

Controlling Acceleration/Deceleration

In the recording apparatus 1 of this embodiment, the acceleration/deceleration area of the carriage 2 is at both right and left ends in the reciprocating scanning operation, as shown in FIGS. 11A and 11B. For this reason, the acceleration/deceleration needs to be controlled separately in a carriage moving area 50 for the end at which the pressure is shifted to the positive side (a first area 51) and for the end at which the pressure is shifted to the negative side (a second area 52).

The first area 51 and the second area 52 will be described hereinbelow.

First Area

The first area 51 in this specification will be described with reference to FIG. 11A. The pressure in the recording head 3 is shifted to the positive side, that is, increased, when an inertia force toward the recording head 3 acts on the ink 7 in the acceleration/deceleration area of the supply tube 4. Referring to FIG. 11A, the supply tube 4 is disposed on the left of the recording head 3. For this reason, an inertia force toward the recording head 3 acts on the ink 7 in the supply tube 4 in the deceleration area in which the carriage 2 is decelerated from the constant velocity and stops in the state of FIG. 11A. Also in the area in which the carriage 2 is accelerated to the constant velocity from the stopped state, an inertia force toward the recording head 3 acts on the ink 7 in the supply tube 4. Thus, in the carriage 2 acceleration/deceleration area at the right of the recording apparatus 1 in FIG. 11A, the pressure changes in the direction in which the negative pressure in recording head 3 decreases. In this specification, the acceleration/deceleration area on the right (at which the negative pressure in the recording head 3 decreases) shown in FIG. 11A is referred to as “first area”.

Second Area

The second area 52 in this specification will be described with reference to FIG. 11B. The pressure in the recording head 3 is shifted to the negative side, that is, decreased, when an inertia force in the direction opposite to the recording head 3 acts on the ink 7 in the acceleration/deceleration area of the supply tube 4. An inertia force in the direction opposite to the recording head 3 acts on the ink 7 in the deceleration area of the supply tube 4 in which the carriage 2 is decelerated from the constant velocity and stops in the state of FIG. 11B. Also in the area in which the carriage 2 is accelerated to the constant velocity from the stopped state, an inertia force in the direction opposite to the recording head 3 acts on the ink 7 in the supply tube 4. Thus, in the carriage 2 acceleration/deceleration area at the left of the recording apparatus 1 in FIG. 11B, the pressure changes in the direction in which the negative pressure in recording head 3 increases. In this specification, the acceleration/deceleration area on the right (at which the negative pressure in the recording head 3 increases) shown in FIG. 11B is referred to as “second area”.

The above relationship depends on how the supply tube 4 creeps. Referring to FIG. 11A, the supply tube 4 is disposed on the left of the recording head 3. However, when the supply tube 4 is connected on the right of the recording head 3, and the bent portion 42 is on the right of the recording head 3, the relationship between an increase and a decrease in the pressure is opposite. In this case, the first area 51 and the second area 52 are reversed left to right.

The first and second areas depend on, not the positional relationship in the recording apparatus 1, but an increase and decrease in the internal pressure of the recording head 3.

This embodiment will be described in more detail with reference to examples and comparative examples. The present disclosure is not limited to the following examples unless departing from the spirit of the present disclosure. For example, even if the size of the apparatus, the colors and the number of inks, the length and the diameter of the tube, the carriage velocity, or the nozzle diameter of the recording head is changed, the advantageous effects of the present disclosure are given.

Example 1

In this example, the ink-jet recording apparatus 1 illustrated in FIG. 1 was used. The recording apparatus 1 is an A1-size ink-jet printer. This example uses image data that uses only black (Bk) ink. The recording head 3 used does not include a damper that absorbs the dynamic pressure. The printing environmental temperature of this example was 25° C.

Average Duty Cycle Per One Band

The print patterns in the examples and comparative examples of the present disclosure were set at an average duty cycle per band. The discharge rate per dot of the recording head 3 used in this example was about 11.4 ng. For the definition of the average duty cycle, application of two dots of ink to a 1/600 inch (600 dpi) square was defined as 100% duty cycle. Accordingly, if the average duty cycle per band is 100%, the application amount is 22.8 ng/600 dpi. In this example, the average duty cycle per band for black (Bk) was set to 5% (the application amount in this case can be converted to 1.1 ng/600 dpi), and for the other colors, the average duty cycle per band was set to 0%.

First Area and Second Area

In the embodiments and comparative examples below, the first area 51 is the acceleration/deceleration area shown in FIG. 11A, that is, the right of the recording apparatus 1, and the second area 52 is the acceleration/deceleration area shown in FIG. 11B, that is, the left of the recording apparatus 1. The acceleration/deceleration in the individual acceleration/deceleration areas can be controlled independently. The acceleration/deceleration is determined by the CPU 401, and the carriage-motor driving circuit 414 moves the carriage 2 on the basis of an acceleration control signal sent from the CPU 401. In this example, the acceleration in the first area 51 was set to 1.0 m/s/s, and the deceleration in the first area 51 was set to 20.0 m/s/s, and both of the acceleration and the deceleration in the second area 52 were set to 20.0 m/s/s, as shown in Table 4. The target carriage velocity was set to 40 inch/s.

Evaluating Image

If the meniscus is broken, the ink expands over the nozzle surface of the recording head 3 to cause the ejection ink to be drawn by the ink expanding over the nozzle surface, causing wet misfiring.

For evaluation of the effects of the embodiments and the comparative examples, it was visually determined whether print streaks were generated on the image when image data was continuously printed on five sheets of A1-size plane paper. A solid image as shown in FIG. 9A was input as the image data so that the duty cycle was uniform among the individual bands. If print streaks occur even partially, it is determined that "misfiring occurred", and if the image quality was high without print streaks, it was determined that "misfiring not occurred". The time taken to print one sheet of A1-size paper was also measured, and it was evaluated as throughput. The results are shown in Table 4.

In Example 1, the absolute value of acceleration at acceleration in the first area 51 was set significantly less than the absolute value of acceleration at acceleration and the absolute value of acceleration at deceleration in the second area 52. This allows the increase in the reference line of pressure variations to be kept low at about 25 mmAq, causing no print streaks due to misfiring. Thus, the print result was "misfiring not occurred". Thus, it was determined that deterioration of images can be prevented as compared with Comparative Example 1 in which all of the acceleration/deceleration was 20.0 m/s/s, and the increase in the reference line of pressure variations was about 75 mmAq, so that misfiring occurred.

Example 2

In Example 2, the absolute value of acceleration at deceleration in the first area 51 was set to 1.0 m/s/s, and the absolute value of acceleration at acceleration was set to 20.0 m/s/s. This also caused no print streaks, having the same advantageous effects as those of Example 1.

Example 3

In Example 3, the absolute value of acceleration at acceleration in the first area 51 was set to 1.0 m/s/s, which is less than the absolute value 20.0 m/s/s of acceleration at acceleration and deceleration in the second area 52. The absolute value of acceleration at deceleration in the first area 51 was set to 22.0 m/s/s greater than 20.0 m/s/s. The result of printing was "Misfiring not occurred". The reference line of pressure variations was 40 mmAq, which is slightly greater than those of Example 1 and Example 2. However, no print streaks occurred, in other words, the deterioration of image quality could be prevented, as compared with Comparative Example 1.

Example 4

In Example 4, the absolute value of acceleration at acceleration in the first area 51 was set to 20.0 m/s/s, and the absolute value of acceleration at deceleration in the first area 51 was set to 1.0 m/s/s. In contrast, the absolute value of acceleration at acceleration in the second area 52 was set to 18 m/s/s, and the absolute value of acceleration at deceleration in the second area 52 was set to 20.0 m/s/s. In other words, the absolute value of acceleration at acceleration in the first area 51 was set greater than the absolute value of acceleration at acceleration in the second area 52, and the absolute value of acceleration at acceleration and the absolute value of acceleration at deceleration in the second area 52 were set greater than the absolute value of acceleration at deceleration in the first area 51. The result of printing was "Misfiring not occurred", and the reference value of pressure variations was 30 mmAq, which is slightly greater than those of Example 1 and Example 2. This may be caused by the decrease in inertia force that decreases the pressure in the recording head 3 due to the decrease in the absolute value of acceleration at deceleration in the second area 52.

The results in Example 3 and Example 4 show that it is effective when at least one of the absolute value of acceleration at acceleration and the absolute value of acceleration at deceleration in the first area 51 is less than the absolute value of acceleration at acceleration or deceleration in the second area 52.

Example 5

In Example 5, the absolute values of acceleration at acceleration and deceleration in the first area 51 were set to 3.0 m/s/s, which is less than the absolute value 20.0 m/s/s of acceleration at acceleration and deceleration in the second area 52. The printing duty cycle was set to 3% which is lower than those of Examples 1 to 4. Under the above conditions, the reference line of pressure variations during printing was about 0 mmAq without variations. As a result, no misfiring occurred, providing a high-quality image. This showed greater effects than those of Examples 1 to 4 in terms of pressure variations, allowing coping with the low duty cycle.

Example 6

In Example 6, the difference between the absolute values of acceleration/deceleration in the first area 51 and the absolute values of acceleration/deceleration in the second area 52 was set smaller than that in Example 5. Specifically, the absolute values of acceleration/deceleration in the first area 51 were set to 5.0 m/s/s, and the absolute values of acceleration/deceleration in the second area 52 were set to 13.0 m/s/s. As a result, the reference line of pressure variations was increased by about 15 mmAq from that of Example 5, but no misfiring occurred, providing a high-quality image.

Example 7

Figure 12:
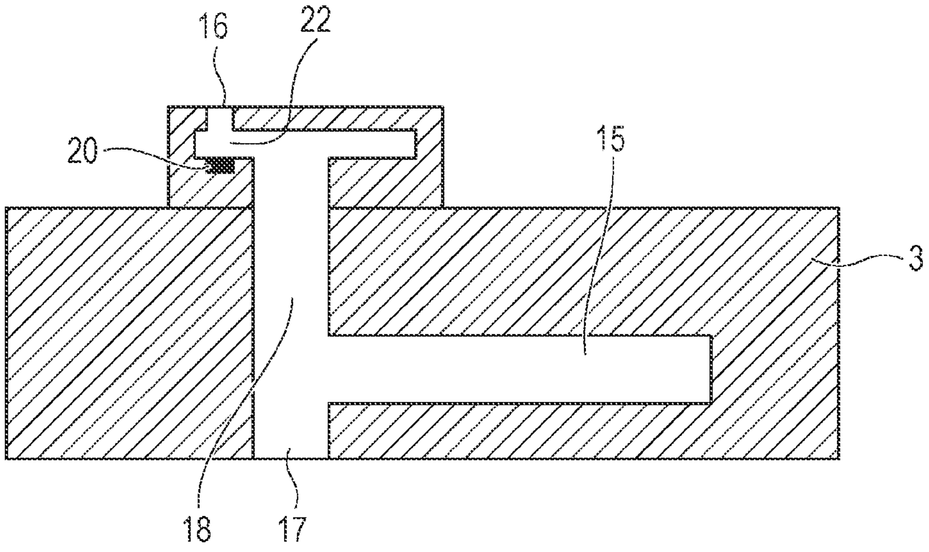
FIG. 12 is a schematic diagram of a recording head with a damper in Example 7.

In Example 7, a recording head 3 including the damper shown in FIG. 12 was used. The ink supplied to the recording head 3 passes through an ink communication port 17 and an ink channel 18 into an ink chamber 22. The ink in the ink chamber 22 is ejected to the outside of the recording head 3 through an ejection port 16 by driving a recording element 20. The recording head 3 includes a damper chamber 15. The damper chamber 15 is made of a flexible member and varies in size according to the pressure. The absolute values of acceleration/deceleration in the first area 51 were set to 18 m/s/s, and the absolute values of acceleration/deceleration in the second area 52 were set to 20 m/s/s. Since the absolute value of acceleration/deceleration in the first area 51 is greater than those of Examples 1 to 6, the ink is acted upon by a large inertia force, and the reference line of pressure variations reached 70 mmAq, which is larger than those of above examples. However, the result of printing caused no print streaks and misfiring. The result of this example showed that the presence of the damper allows withstanding larger pressure variations than Examples 1 to 6.

Example 8

In this example, the acceleration/deceleration is decreased to the minimum required for the average duty cycle of image data. In addition, for an image partly including a low duty cycle portion, the absolute values of acceleration/deceleration in the first area 51 are decreased only for a band corresponding to that portion, and in the viewpoint of throughput, acceleration/deceleration is not limited for the entire A1-size paper. Accordingly, in Example 8, the recording head 3 without the damper, used in Examples 1 to 6, was used, and a table in which acceleration/deceleration for each band corresponding to the average duty cycle of the band is set was prepared in the ROM 402 of the recording apparatus 1. In Table 1, the individual bands are numbered for description. The first band at which printing is started is numbered 1, and an image corresponding to 78 bands was input in total. The average duty cycle of the image pattern was decreased every 13 bands. The bands whose average duty cycle per band is 88% and 50% eject a large amount of ink, which may reduce a sufficient pressure in the recording head 3, so that the absolute value of acceleration/deceleration is not decreased. In other words, when the average duty cycle is half or higher (50% or higher) the maximum value (100%), the absolute value of acceleration/deceleration is nor decreased. In addition, for the bands of No. 66 to 78 in which no print data is present in one band, the absolute value of acceleration/deceleration is not decreased. This is because no ink is ejected, which does not trigger a meniscus break, reducing the tendency to break the meniscus even if the pressure in the recording head 3 is high to some degree. For the bands of Nos. 27 to 65, the absolute values of acceleration at acceleration/deceleration in the first area 51 were set less than the absolute value 20.0 m/s/s of the acceleration at acceleration/deceleration in the second area 52 according to the respective average duty cycles per band by multiplying proportions set according to the duty cycles per band. For example, for the band of Nos. 27 to 39, the absolute value was set to 20.0×0.93=18.6 m/s/s. As a result, no print streaks occurred in all the bands, providing a high-quality image. In addition, the reference line of pressure variations increased by about 30 mmAq at the maximum, which is an increase that can be withstood by the recording head 3 without a damper. The throughput can be made almost equal to that of Comparative Example 2 in which all of accelerations/decelerations are 20.0 mm/s/s because of a minimum required decrease in acceleration/deceleration, allowing outputting a high-quality image at high speed.

TABLE 1

Average Duty Cycle per Band and Acceleration/Deceleration Setting Table in EXAMPLE 8

| Average Duty Cycle per Band [%] | Ratio of Acceleration to Deceleration First Area/Second Area | Corresponding Band No. |
|---|---|---|
| 88 | 1 (Not to Be Executed) | 1-13 |
| 50 | 1 (Not to Be Executed) | 14-26 |
| 20 | 0.93 | 27-39 |
| 10 | 0.80 | 40-52 |
| 3 | 0.73 | 53-65 |
| 0 | 1 (Not to Be Executed) | 66-78 |

Example 9

In Example 9, image data is input also for colors other than black (Bk). Image data that uses cyan (C), magenta (M), and yellow (Y) in addition to black (Bk), as shown in Table 2, was prepared. Table 2 shows an extract of image data of one band in A1-size image data and the ratio of acceleration/deceleration corresponding to the image data. Comparison among the average duty cycles of the individual colors in one band showed that the color with the highest average duty cycle was cyan (C) at 20%. In contrast, the color with the lowest average duty cycle was yellow (Y) at 0%. The higher the average printing duty cycle per band, the more the pressure in the recording head 3 decreased in pressure, which is advantageous against misfiring, as described in this specification. Accordingly, the most disadvantageous color against misfiring among the colors in Table 2 is yellow (Y) whose average duty cycle per band is 0%. However, if no ink is ejected at all, there is no cause to break the meniscus, allowing withstanding a certain amount of high pressure, as described in Example 8. Thus, the color that is most disadvantageous against misfiring in Table 2 is magenta (M) whose the average duty cycle is 3%. This example employed the ratio of acceleration/deceleration corresponding to magenta (M) with the lowest average duty cycle 3% among the ejected colors and set the absolute value of acceleration at acceleration and deceleration in the first area 51 to 0.62 times the absolute value of acceleration at acceleration and deceleration in the second area 52. As a result, no misfiring occurred in all the colors, providing a high-quality image without print streaks.

The result of Comparative Example 5 in which the ratio of black (Bk) whose average duty cycle per band is 10% is employed is also listed in Table 4. As a result, no print streaks occurred in black (Bk), cyan (C), and yellow (Y), but misfiring occurred and print streaks appeared in magenta (M).

TABLE 2

Average Duty Cycle per Band of Each Color and Acceleration/Deceleration Setting Table in EXAMPLE 9

| Color | Average Duty Cycle per Band [%] | Ratio of Acceleration to Deceleration First Area/Second Area |
|---|---|---|
| K | 10 | 0.69 |
| C | 20 | 0.80 |
| M | 3 | 0.62 |
| Y | 0 | 0.60 |

Example 10

Example 10 uses a recording apparatus 1 including a thermometer capable of measuring the temperature in the recording apparatus 1. The printing environmental temperature was increased to 40° ° C. from 25° ° C. in Examples 1 to 9, and the same examination was performed. Ink temperature changes according to the printing environmental temperature. The viscosity decreases as the ink temperature increases, which makes it easier for the ink in the supply tube 4 to move with an equivalent inertia force. In this example, the viscosity 3.5 mPa's of black (Bk) at 25° C. changed to 2.4 mP·s when heated to 40° C. To prevent the reference value of pressure variations from increasing, Table 3 for the printing environmental temperature was prepared on the basis of the above measurement results and was recorded in the ROM 402 of the recording apparatus 1. The printing environmental temperature was measured using a temperature and humidity sensor 23 provided in the recording apparatus 1, as shown in FIGS. 11A and 11B. The temperature was checked against Table 3, and the absolute value of acceleration at acceleration and deceleration in the first area 51 was decreased by the amount corresponding to the ratio of acceleration/deceleration set in Table 3. The image data used was only of black (Bk), and the average duty cycle per band was set to 5%. Since the printing environmental temperature was set to 40° C., the absolute value of acceleration at acceleration and deceleration in the first area 51 was 0.42 times the absolute value of acceleration at acceleration and deceleration in the second area 52. As a result, no print streaks were visually observed, and the throughput was 95 seconds.

TABLE 3

Printing Environmental Temperature and Acceleration/Deceleration Setting Table in EXAMPLE 10

| Color | Average Duty Cycle per Band [%] | Printing Environmental Temperature [° C.] | Ratio of Acceleration to Deceleration First Area/Second Area |
|---|---|---|---|
| Bk | 5 | 15 | 0.86 |
| | | 20 | 0.73 |
| | | 25 | 0.62 |
| | | 30 | 0.53 |
| | | 35 | 0.46 |
| | | 40 | 0.42 |

Example 11

In Examples 11 to 13, the length L from the bent portion of the supply tube 4 to the connection 25 with the recording head 3 was taken into account in setting the acceleration/deceleration. As shown in FIGS. 6 and 7, variations in pressure increase as the length L increases. Accordingly, the larger the difference between the length L in the first area and the length L in the second area, the greater the reference value of pressure variations.

Figure 13:
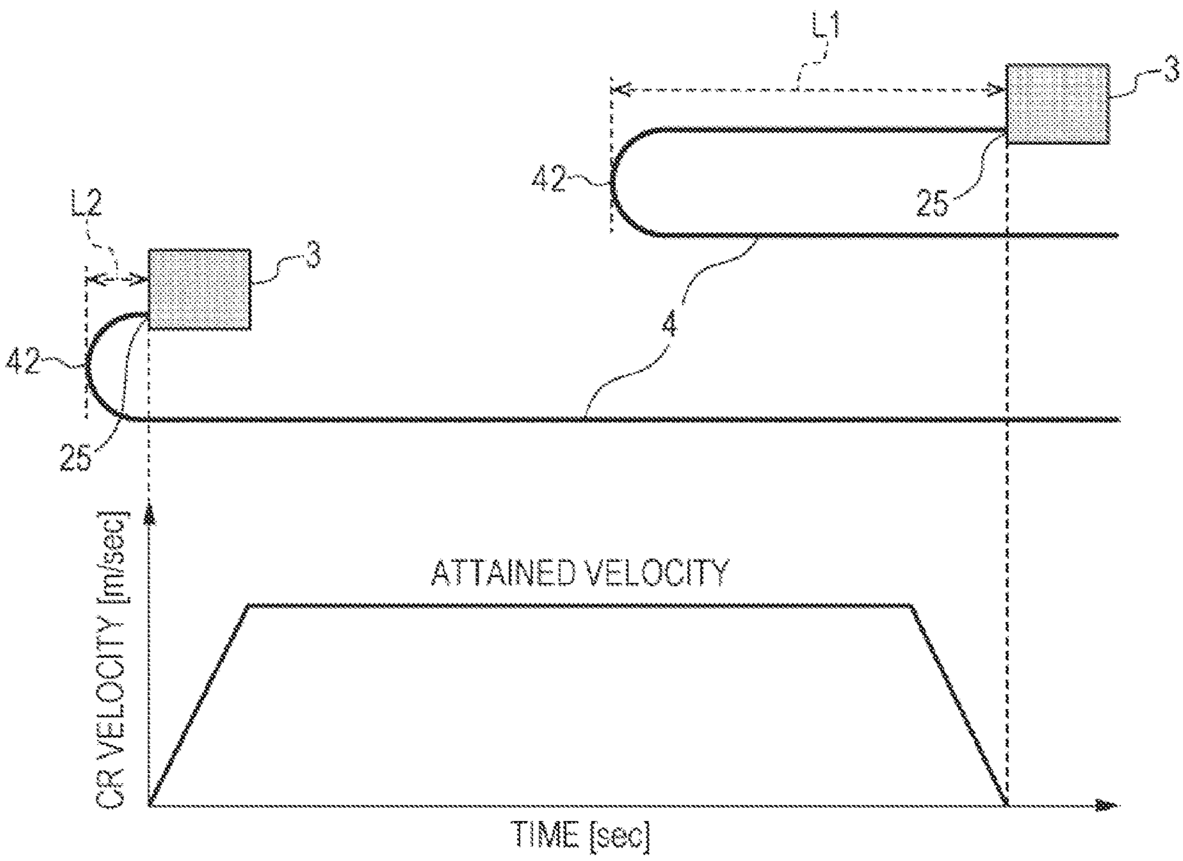
FIG. 13 is a schematic diagram illustrating the length from a bent portion to a recording head connection in Example 11.

In this example, the length L is the length from the bent portion 42 to the connection 25 with the recording head 3 when the carriage velocities in the first area and the second area are 0, that is, the recording head 3 is located at the opposite end extremities of the recording apparatus 1. Specifically, as shown in FIG. 13, the length from the bent portion 42 of the supply tube 4 to the connection 25 with the recording head 3 when the carriage 2 has reached to the right in the recording apparatus 1 was set as length L1 in the first area. The length from the bent portion 42 of the supply tube 4 to the connection 25 with the recording head 3 when the carriage 2 has reached to the left of the recording apparatus 1 was set as length L2 in the second area. In addition, the absolute value of acceleration was set so that the absolute value $dv_1/dt$ of acceleration at acceleration and deceleration in the first area and the absolute value $dv_2/dt$ of acceleration at acceleration and deceleration in the second area have the relationship of Eq. 1.

$$\frac{dv_1}{dt} = \frac{L_2}{L_1}\frac{dv_2}{dt} \tag{1}$$

In this example, the length L1 was 300 mm, and the length L2 was 50 mm. Thus, when the absolute value of acceleration at acceleration and deceleration in the second area was set to 20.0 m/s/s, the absolute value of acceleration at acceleration and deceleration in the first area was 3.3 m/s/s. When printing is started with this setting value of acceleration/deceleration, the reference value of pressure variations was about 0 mmAq, and the result of printing was "misfiring not occurred", which showed that it was effective. The throughput was 105 seconds.

Example 12

Figure 14:
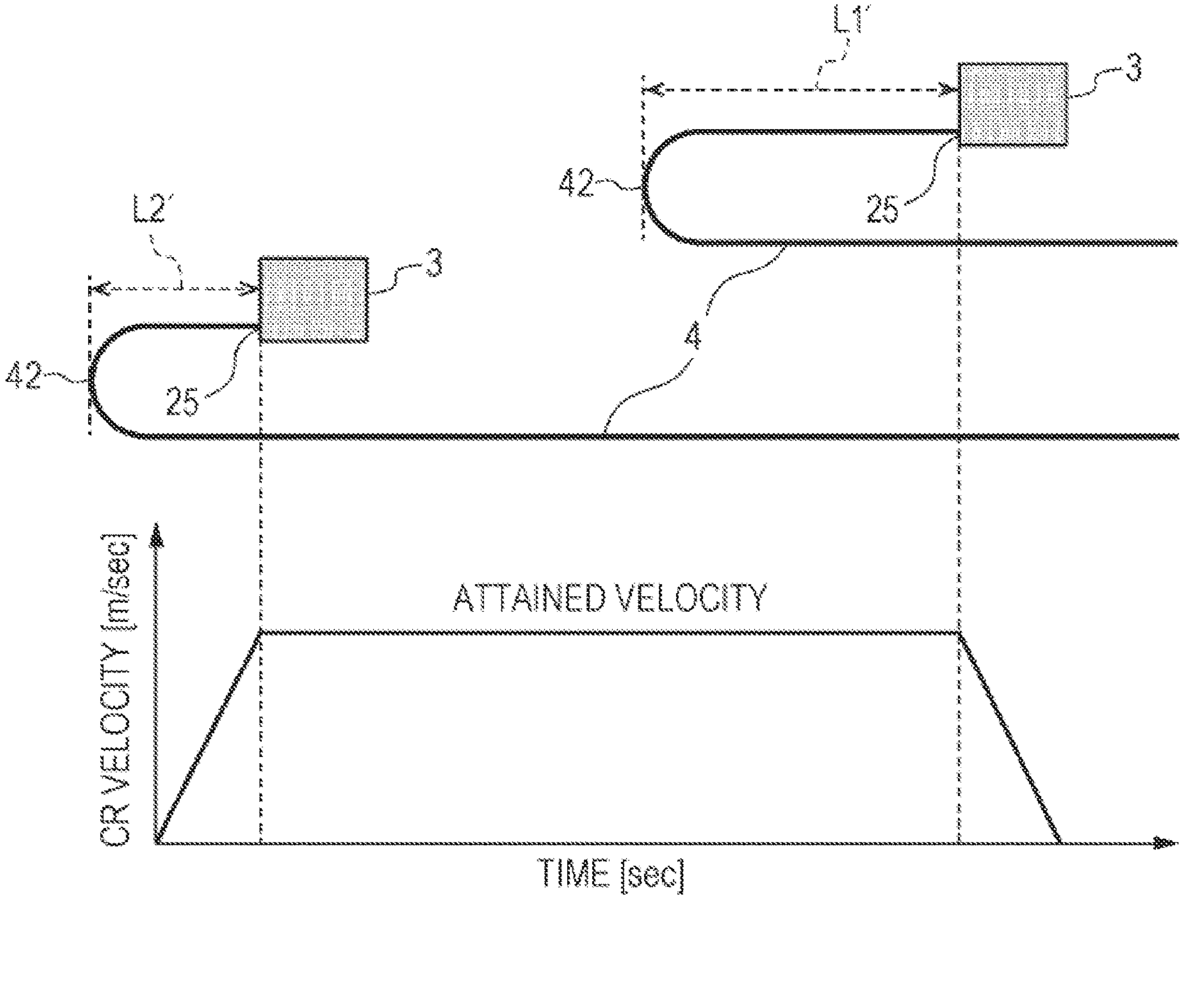
FIG. 14 is a schematic diagram illustrating the length from a bent portion to a recording head connection in Example 12.

In this example, the length L from the bent portion 42 of the supply tube 4 to the connection 25 with the recording head 3 was set to the length at the trailing end of the acceleration area and the leading end of the deceleration area. In other words, the length L is the length in a state in which the acceleration or deceleration in the acceleration/deceleration areas is 0 m/s/s, and the carriage 2 is moving. In this example, the length in the first area is denoted as L1', and the length in the second area is denoted as L2'. FIG. 14 illustrates L1' and L2'. The lengths L1' and L2' can be expressed as Eqs. 2 and 3 using L1 and L2 and the absolute value $dv_2/dt$ of acceleration at acceleration and deceleration in the second area in Example 11.

$$L_{1'} = L_1 - \frac{1}{2}\frac{dv_2}{dt}t^2 \tag{2}$$

$$L_{2'} = L_2 + \frac{1}{2}\frac{dv_2}{dt}t^2 \tag{3}$$

The absolute value $dv_1/dt$ of acceleration at acceleration and deceleration in the first area was expressed as Eq. 4 using the determined L1' and L2'.

$$\frac{dv_1}{dt} = \frac{L_{2'}}{L_{1'}}\frac{dv_2}{dt} \tag{4}$$

In this example, the length L1' was 82 mm, and the length L2' was 268 mm. Accordingly, the absolute value of acceleration at acceleration and deceleration in the first area was set to 6.1 m/s/s, which is about 0.3 times 20.0 m/s/s which is the absolute value of acceleration at acceleration and deceleration in the second area from the relationship of Eq. 4. When printing is started with the above setting, no print streaks occurred, as in Example 11, and the throughput was faster, 99 seconds. However, the absolute value of acceleration at acceleration and deceleration in the first area was greater than the absolute value of acceleration at acceleration and deceleration in the second area, as compared with Example 11. For this reason, the reference value of pressure variations increased slightly to 25 mmAq although no misfiring occurred.

Example 13

Figure 15:
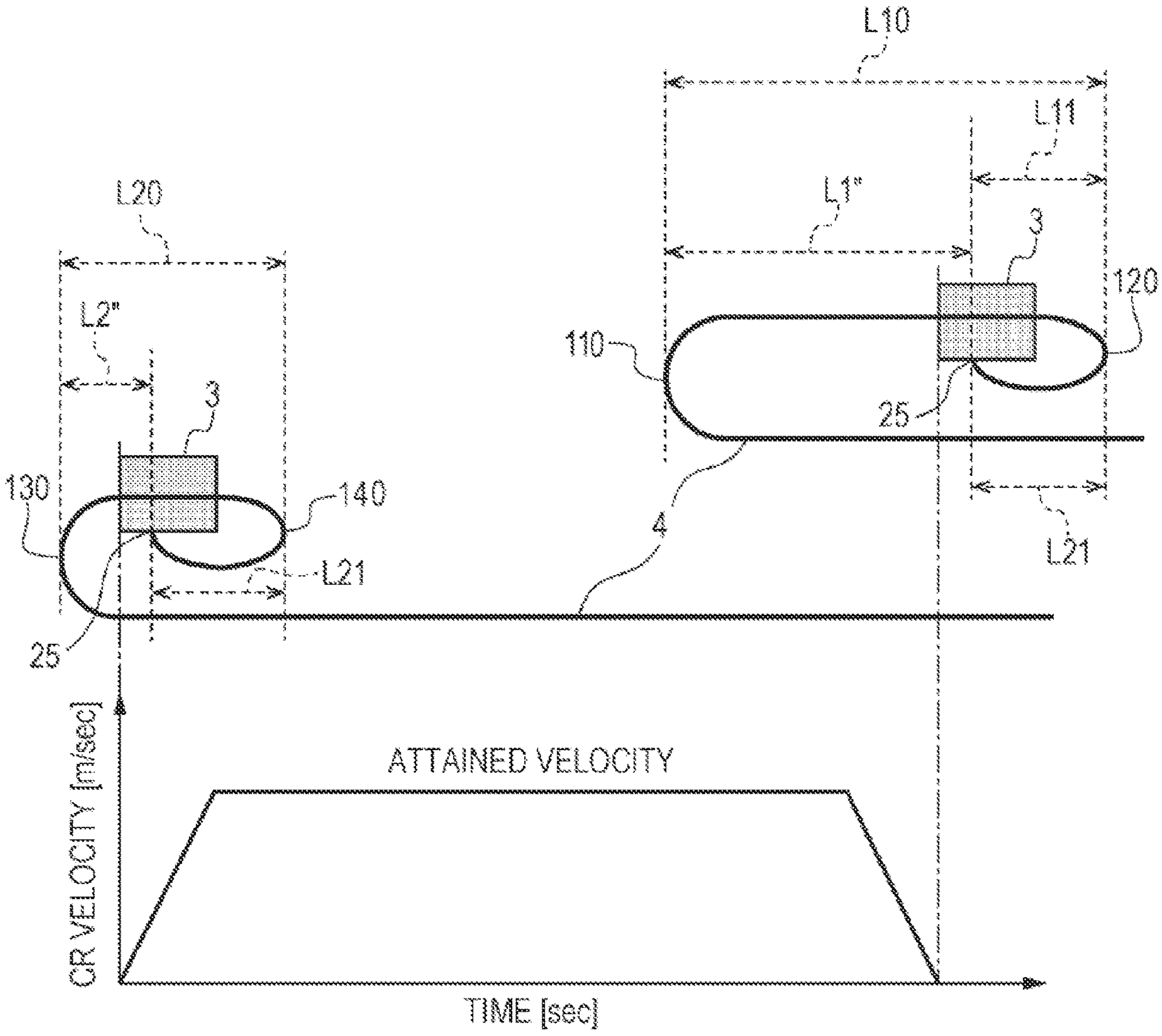
FIG. 15 is a schematic diagram illustrating the length from a bent portion to a recording head connection in Example 13.

In this example, a length L from a bent portion to the connection 25 with the recording head 3 was determined in consideration of the ink flowing direction. In this example, as shown in FIG. 15, the supply tube 4 creeps so as to have two bent portions 130 and 140 upstream in the direction in which ink flows from the main tank 9 to the recording head 3. In the case where the recording head 3 is located downstream, the supply tube 4 creeps so as to have bent portions 110 and 120.

In this case, the direction of the inertia force acting on the ink in the supply tube 4 from the bent portion 110 to the bent portion 120 in the first area is opposite to the direction of the inertia force acting on the ink in the supply tube 4 from the bent portion 120 to the connection 25 with the recording head 3.

Accordingly, for the pressure in the recording head 3, the inertia force acting on the ink in the supply tube 4 between the bent portion 110 and the bent portion 120 acts toward the positive pressure side. The inertia force acting on the ink in the supply tube 4 from the bent portion 120 to the connection 25 with the recording head 3 acts toward the negative pressure side. In the second area, an opposite force acts similarly. Accordingly, for pressure variations, the length L10 of the supply tube 4 between the bent portion 110 and the bent portion 120 minus the length L11 between the bent portion 120 and the connection 25 with the recording head 3 in the first area is referred to as L1". In this example, the lengths 10, 11, and L1" are not actual lengths of the supply tube 4 but the lengths projected in the moving direction of the carriage 2. Likewise, the length L2" is the length L20 of the supply tube 4 between the bent portion 130 and the bent portion 140 projected in the moving direction of the carriage 2 minus the length L21 of the supply tube 4 between the bent portion 140 and the connection 25 with the recording head 3 projected in the moving direction of the carriage 2. Thus, the absolute value $dv_1/dt$ of acceleration at acceleration and deceleration in the first area of this example was set to 4.0 m/s/s determined from Eq. 5.

$$\frac{dv_1}{dt} = \frac{L_2''}{L_1''}\frac{dv_2}{dt} \tag{5}$$

During printing, the reference value of pressure variations shifted about 5 mmAq to the positive pressure side, but no print streaks occurred, and it was determined that no misfiring occurred. The throughput was 103 seconds. Thus, also the supply tube 4 having two or more bent portions as in this example prevents deterioration of image quality by controlling the acceleration/deceleration.

Comparative Example 1

In Comparative Example 1, all of the absolute values of acceleration at acceleration and deceleration in the first area and the second area were set to 20.0 m/s/s, as shown in Table 4. The examination showed that the reference value of pressure variations increased by about 75 mmAq, causing print streaks.

Comparative Example 2

Next, in Comparative Example 2, the average duty cycle per band was set to 80% only for black (Bk) image data under the same conditions as in Comparative Example 1. The result of printing was “misfiring not occurred”. This is because the reference value of pressure variations did not change because the pressure in the recording head is decreased by ejecting ink. A low printing duty cycle as in Comparative Example 1 causes print streaks.

Comparative Example 3

In Comparative Example 3, all of the absolute values of acceleration/deceleration were set to 30 m/s/s. In addition, the recording head includes a damper for absorbing dynamic pressure as shown in FIG. 12. As a result, misfiring occurred to cause print streaks despite the installation of the damper. A pressure exceeding the capacity broke the meniscus of the nozzle despite of the installation of the damper.

Comparative Example 4

In Comparative Example 4, the absolute value of acceleration at acceleration and deceleration in the first area was set to 13.0 m/s/s, and the absolute value of acceleration at acceleration and deceleration in the second area was set to 10.0 m/s/s. Although the acceleration/deceleration were decreased as a whole, the absolute value of acceleration/ deceleration in the first area was greater than the absolute value of acceleration/deceleration in the second area. As a result, the reference value of pressure variations in the recording head increased significantly, causing misfiring. This shows that the relative relationship between the acceleration/deceleration in the first area and the acceleration/deceleration in the second area has an effect.

Comparative Example 5

In Comparative Example 5, the image data used in Example 9 was input, and the acceleration and the deceleration in the first area were set to 18.0 m/s/s suited to the average duty cycle per band of black (Bk). As a result, for black (Bk), the average duty cycle was high, forming a high-quality image, but for magenta (M) with the low average duty cycle, print streaks due to misfiring occurred.

The table below is a list of the examination conditions of Examples 1 to 13 and Comparative Examples 1 to 5.

The apparatus configurations described above are mere examples of an apparatus configuration for realizing the present disclosure. It is needless to say that, even if the size of the recording apparatus, the number of print inks, the number of supply tubes, the number of ejecting element substrates, and so on differ, the present disclosure is applicable. Although the examples illustrate a configuration in which the carriage velocity is controlled using, not the average duty cycle, the average duty cycle, the carriage velocity may be determined using the total dot count per band, the total amount of ink ejected, or the like.

The embodiments prevent ejection failure due to the breakage of the meniscus.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

TABLE 4

Examination Conditions of Examples and Comparative Examples

| | Average Duty Cycle per Scan [%] | Head Damper Present/ Absent | Environmental Temperature [° C.] | Absolute Value of Acceleration/Deceleration in First Area [m/s/s] | | Absolute Value of Acceleration/ Deceleration in Second Area [m/s/s] | | Misfiring | Transition of Pressure Variation Reference Value [mmAq] | Throughput [s/A1] |
|---|---|---|---|---|---|---|---|---|---|---|
| | | | | Acceleration | Deceleration | Acceleration | Deceleration | | | |
| Example 1 | Bk-5% | Absent | 25 | 1.0 | 20.0 | 20.0 | 20.0 | Not Occurred | ≈25 | 114 |
| Example 2 | Bk-5% | Absent | 25 | 20.0 | 1.0 | 20.0 | 20.0 | Not Occurred | ≈25 | 114 |
| Example 3 | Bk-5% | Absent | 25 | 1.0 | 22.0 | 20.0 | 20.0 | Not Occurred | ≈40 | 114 |
| Example 4 | Bk-5% | Absent | 25 | 20.0 | 1.0 | 18.0 | 20.0 | Not Occurred | ≈30 | 114 |
| Example 5 | Bk-3% | Absent | 25 | 3.0 | 3.0 | 20.0 | 20.0 | Not Occurred | ≈0 | 106 |
| Example 6 | Bk-3% | Absent | 25 | 5.0 | 5.0 | 13.0 | 13.0 | Not Occurred | ≈15 | 102 |
| Example 7 | Bk-3% | Present | 25 | 18.0 | 18.0 | 20.0 | 20.0 | Not Occurred | ≈70 | 95 |
| Example 8 | Bk-3% | Absent | 25 | Change for Each Band | | 20.0 | 20.0 | Not Occurred | =30 | 95 |
| Example 9 | Bk-10% M-3% | Absent | 25 | Change for Each Band | | 20.0 | 20.0 | Not Occurred | =30 | 95 |
| Example 10 | Bk-5% | Absent | 40 | 8.4 | 8.4 | 20.0 | 20.0 | Not Occurred | ≈20 | 98 |
| Example 11 | Bk-5% | Absent | 25 | 3.3 | 3.3 | 20.0 | 20.0 | Not Occurred | ≈0 | 105 |
| Example 12 | Bk-5% | Absent | 25 | 6.1 | 6.1 | 20.0 | 20.0 | Not Occurred | ≈25 | 99 |
| Example 13 | Bk-5% | Absent | 25 | 4.0 | 4.0 | 20.0 | 20.0 | Not Occurred | ≈5 | 103 |
| Comparative Example 1 | Bk-5% | Absent | 25 | 20.0 | 20.0 | 20.0 | 20.0 | Occurred | ≈75 | 95 |
| Comparative Example 2 | Bk-80% | Absent | 25 | 20.0 | 20.0 | 20.0 | 20.0 | Not Occurred | ≈0 | 95 |
| Comparative Example 3 | Bk-5% | Present | 25 | 30.0 | 30.0 | 30.0 | 30.0 | Occurred | ≈100 | 93 |
| Comparative Example 4 | Bk-5% | Absent | 25 | 13.0 | 13.0 | 10.0 | 10.0 | Occurred | ≈80 | 98 |
| Comparative Example 5 | Bk-10% M-3% | Absent | 25 | 18.0 | 18.0 | 20.0 | 20.0 | Occurred (M) | ≈70 | 95 |

This application claims the benefit of Japanese Patent Application No. 2021-106633 filed Jun. 28, 2021, which is hereby incorporated by reference herein in its entirety.

What is claimed is:

1. A recording apparatus comprising:

an ink tank configured to store ink;

a recording head including a nozzle configured to eject ink and, when not ejecting ink, to use an ink meniscus formed in the nozzle from the ink to prevent ink from dripping;

a carriage having the recording head mounted on the carriage and configured to move back and forth in predetermined directions to perform recording on a recording medium;

a carriage control unit configured to move the carriage; and a supply tube connected to the recording head and the ink tank and configured to supply ink from the ink tank into the recording head, wherein the supply tube includes a bent portion configured to move with movement of the carriage in the predetermined directions, wherein, of an acceleration/deceleration area of a carriage moving area in which the carriage is accelerated or decelerated to change speed of the carriage, an area in which pressure in the recording head changes to decrease negative pressure in the recording head is identified as a first area, and an area in which the pressure in the recording head changes to increase the negative pressure in the recording head is identified as a second area, and wherein the carriage control unit is configured to move the carriage in such a manner that an absolute value of acceleration of the carriage that is accelerated or decelerated in the first area (i) is less than an absolute value of acceleration of the carriage that is accelerated or decelerated in the second area and (ii) is such that an increase in the pressure in the recording head due to the movement of the carriage in the first area moving ink from the supply tube into the recording head is insufficient to break the ink meniscus in the nozzle.

2. The recording apparatus according to claim 1, wherein the recording head is configured to eject ink based on image data, the recording apparatus further comprising an acquisition unit configured to acquire, based on the image data, information on an amount of ink to be ejected to one band that is an area that is recordable by the carriage moving in one of the predetermined directions, wherein the carriage control unit makes a determination, according to the amount of ink to be ejected to the one band indicated by the information acquired by the acquisition unit, of whether to move the carriage in such a manner that the absolute value of the acceleration of the carriage in the first area is less than the absolute value of the acceleration of the carriage in the second area or to move the carriage in such a manner that the absolute value of the acceleration of the carriage in the first area is equal to the absolute value of the acceleration of the carriage in the second area, and moves the carriage based on the determination made by the carriage control unit.

3. The recording apparatus according to claim 2, wherein, when the amount of ink to be ejected to the one band indicated by the information acquired by the acquisition unit is less than a predetermined amount, the carriage control unit moves the carriage in such a manner that the absolute value of the acceleration of the carriage in the first area is less than the absolute value of the acceleration of the carriage in the second area, and wherein, when the amount of ink to be ejected to the one band indicated by the information acquired by the acquisition unit is more than or equal to the predetermined amount, the carriage control unit moves the carriage in such a manner that the absolute value of the acceleration of the carriage in the first area is equal to the absolute value of the acceleration of the carriage in the second area.

4. The recording apparatus according to claim 3, wherein the predetermined amount is more than or equal to half a maximum amount that the recording head can eject to the one band.

5. The recording apparatus according to claim 3, wherein, when the amount of ink to be ejected to the one band indicated by the information acquired by the acquisition unit is not zero and is less than the predetermined amount, the carriage control unit moves the carriage in such a manner that the absolute value of the acceleration of the carriage in the first area is less than the absolute value of the acceleration of the carriage in the second area, and wherein, when the amount of ink to be ejected to the one band indicated by the information acquired by the acquisition unit is zero, the carriage control unit moves the carriage in such a manner that the absolute value of the acceleration of the carriage in the first area is equal to the absolute value of the acceleration of the carriage in the second area.

6. The recording apparatus according to claim 2, wherein the recording head is capable of ejecting a plurality of colors of ink, wherein the acquisition unit acquires, based on the image data, information on an amount of ink to be ejected to the one band for each of the plurality of colors, and wherein the carriage control unit controls a speed of movement of the carriage based on an amount of ink to be ejected that is the most out of amounts of ink of individual colors to be ejected to the one band, indicated by the information acquired by the acquisition unit.

7. The recording apparatus according to claim 2, wherein the information acquired by the acquisition unit is an average amount of ink to be ejected to the one band.

8. The recording apparatus according to claim 1, wherein the carriage control unit moves the carriage in such a manner that the absolute value of the acceleration of the carriage in the first area is less than the absolute value of the acceleration of the carriage in the second area.

9. The recording apparatus according to claim 1, further comprising a measuring unit capable of measuring temperature in the recording apparatus, wherein the carriage control unit is configured to control a speed of the carriage based on the temperature measured by the measuring unit.

10. The recording apparatus according to claim 9, wherein the carriage control unit controls the carriage in such a manner that the absolute value of the acceleration of the carriage in the second area is greater relative to the absolute value of the acceleration of the carriage in the first area when the temperature measured by the measuring unit is a second temperature higher than a first temperature than when the temperature measured by the measuring unit is the first temperature.

11. The recording apparatus according to claim 1, wherein the carriage control unit is configured to control a speed of the carriage based on a length from the bent portion of the supply tube to a connection between the supply tube and the recording head at start of acceleration or deceleration of the carriage.

12. A method for a recording apparatus having an ink tank storing ink, a recording head including a nozzle, a carriage having the recording head mounted on the carriage, and a supply tube connected to the recording head and the ink tank, the method comprising:

ejecting ink from the nozzle while moving the carriage and the recording head back and forth in predetermined directions to perform recording on a recording medium and, when not ejecting ink, using an ink meniscus formed in the nozzle from the ink to prevent ink from dripping; and supplying ink from the ink tank into the recording head via the supply tube, wherein the supply tube includes a bent portion that moves with movement of the carriage in the predetermined directions, wherein, of an acceleration/deceleration area of a carriage moving area in which the carriage is accelerated or decelerated to change speed of the carriage, an area in which pressure in the recording head changes to decrease negative pressure in the recording head is identified as a first area, and an area in which the pressure in the recording head changes to increase the negative pressure in the recording head is identified as a second area, and wherein, in a case of moving the carriage, moving the carriage includes moving the carriage in such a manner that an absolute value of acceleration of the carriage that is accelerated or decelerated in the first area (i) is less than an absolute value of acceleration of the carriage that is accelerated or decelerated in the second area and (ii) is such that an increase in the pressure in the recording head due to the movement of the carriage in the first area moving ink from the supply tube into the recording head is insufficient to break the ink meniscus in the nozzle.

13. The recording method according to claim 12, wherein the recording head ejects ink based on image data, the recording method further comprising:

acquiring, based on the image data, information on an amount of ink to be ejected to one band that is an area that is recordable by the carriage moving in one of the predetermined directions;

making a determination, according to the amount of ink to be ejected to the one band indicated by the acquired information, of whether to move the carriage in such a manner that the absolute value of the acceleration of the carriage in the first area is less than the absolute value of the acceleration of the carriage in the second area or to move the carriage in such a manner that the absolute value of the acceleration of the carriage in the first area is equal to the absolute value of the acceleration of the carriage in the second area; and moving the carriage based on the made determination.

14. The recording method according to claim 13, wherein, when the amount of ink to be ejected to the one band indicated by the acquired information is less than a predetermined amount, moving the carriage includes moving the carriage in such a manner that the absolute value of the acceleration of the carriage in the first area is less than the absolute value of the acceleration of the carriage in the second area, and wherein, when the amount of ink to be ejected to the one band indicated by the acquired information is more than or equal to the predetermined amount, moving the carriage includes moving the carriage in such a manner that the absolute value of the acceleration of the carriage in the first area is equal to the absolute value of the acceleration of the carriage in the second area.

15. The recording method according to claim 14, wherein the predetermined amount is more than or equal to half a maximum amount that the recording head can eject to the one band.

16. The recording apparatus according to claim 1, wherein, in moving the carriage after a decrease in the pressure in the recording head due to ejection of ink from the recording head, the carriage control unit moves the carriage when not ejecting ink in such a manner that the pressure in the recording head does not exceed a withstand pressure of the ink meniscus formed in the nozzle.

17. The recording apparatus according to claim 1, further comprising a pressure measuring device configured to measure variations in the pressure in the recording head immediately in front of a connection to the supply tube located at the recording head.

18. The recording apparatus according to claim 1, wherein the recording apparatus is a serial-scan recording apparatus, wherein the supply tube is made of a flexible material, where the first and second areas depend on an increase and decrease in an internal pressure of the recording head and do not depend on a positional relationship in the recording apparatus, and wherein the ink tank includes a main tank detachably attached to a main body of the recording apparatus and a subtank connected to the supply tube and to a bottom of the main tank and having a capacity to contain a smaller quantity of ink than the main tank.

* * * * *